(12) United States Patent
Bartlett

(10) Patent No.: US 8,925,951 B2
(45) Date of Patent: Jan. 6, 2015

(54) MULTI-CONFIGURABLE HEIGHT ADJUSTABLE TRAILER

(75) Inventor: Shane Kenneth Bartlett, Alma (AU)

(73) Assignee: The Small Implement Trailer Pty Ltd., Victoria (AU)

( * ) Notice: Subject to any disclaimer, the term of this patent is extended or adjusted under 35 U.S.C. 154(b) by 0 days.

(21) Appl. No.: 13/590,577

(22) Filed: Aug. 21, 2012

(65) Prior Publication Data

US 2013/0214510 A1  Aug. 22, 2013

(30) Foreign Application Priority Data

Aug. 22, 2011  (AU) ................................. 2011903338

(51) Int. Cl.
*B62D 63/06* (2006.01)
*B60P 1/02* (2006.01)

(52) U.S. Cl.
CPC ................. *B62D 63/06* (2013.01); *B60P 1/025* (2013.01)

USPC ........................................................ 280/414.5

(58) Field of Classification Search
CPC ....................................................... B62D 63/06
USPC ........................................................ 280/414.5
See application file for complete search history.

(56) References Cited

U.S. PATENT DOCUMENTS 3,175,710 A * 3/1965 Kistner ......................... 414/534

* cited by examiner

*Primary Examiner* — Joseph M Rocca
*Assistant Examiner* — Felicia L Brittman
(74) *Attorney, Agent, or Firm* — Garcia-Zamor IP Law; Ruy M. Garcia-Zamor

(57) ABSTRACT

A multi-configurable trailer where the load carrying surface can preferably be raised or lowered to enable the easy loading or unloading of the trailer, and/or a variety of different kinds of attachments which can preferably be removably connected to the chassis of the trailer.

19 Claims, 6 Drawing Sheets

MULTI-CONFIGURABLE HEIGHT ADJUSTABLE TRAILER

CROSS REFERENCE TO RELATED APPLICATION

This application claims priority to Australian Patent Application 2011903338, filed Aug. 22, 2011. The above cited application is herein incorporated by reference as if fully set forth in its entirety.

FIELD OF THE INVENTION

This invention relates to multi-configurable trailers where the load carrying surface can be raised and lowered to enable the easy loading or unloading of the trailer, and a variety of different kinds of attachments can be removably connected to the chassis of the trailer, so that the trailer can be reconfigured so as to best suit a variety of types of load types, or functionality.

BACKGROUND OF THE INVENTION

There are a myriad of uses for trailers. Trailers have utility in many rural, domestic and industrial applications in transporting goods, waste, livestock and equipment.

In one of the most common examples, the trailer consists of a chassis with at least two wheels joined together by a common axle. The load carrying surface of the trailer is typically flat, and the periphery of the load carrying surface may have side panels that are attached vertically. At least the rearmost vertical panel may be hingedly attached to the load carrying surface, thereby enabling a user to drop and/or remove the panel so that it at least lays substantially co-planar with the load carrying surface, thereby making it easier to load and unload the trailer.

In many cases it is also possible to tilt the trailer so that the front is raised and the rear is lowered down towards ground level. This may make it easier to slide or roll heavy and/or bulky objects onto and off the trailer.

In other uses, especially when transporting livestock, pets, or other types of animals, a trailer that includes a cage is used to confine the animal during transportation. On a farm for example, it is sometimes necessary to transport livestock, particularly sick or injured livestock, to other parts of the farm where the animal can receive special care and treatment. Animal transport trailers are also useful in urban and rural settings where they are used in association with animal control activities.

Another use for trailers is in the transportation of equipment. As an example, sometimes trailers are used by the elderly and incapacitated to transport mobility devices like powered wheelchairs etc from the person's home to a shopping centre for example. Quite often the person drives their mobility device onto their trailer, hitches it up to their car and then drives to their destination whereat they can offload their mobility device and proceed to move about at their destination, then reverse the procedure for the trip back home.

In a rural setting, like a farm for example, it is quite often necessary to transport feed, or water, or fuel for example from a nearby town to the farm, or from one part of the farm to another. In another example that is particularly relevant for small "hobby" sized farms, quite often only a small trailer sized plough is required to till the relatively small field, and this can easily be towed behind a suitable vehicle, such an all-wheel drive vehicle.

One of the problems associated with current trailers is that a trailer that is good at transporting loads and debris/rubbish, may not be as good at transporting animals or equipment. Quite often multiple trailers are required to provide multiple functions, and this is expensive, and also has the added problem of storing the various trailers when a particular one is not required.

Another problem is associated with loading and offloading trailers. Quite often loads need to be lifted up to the level of the load carrying platform. To remove a load, the load needs to be lowered down to ground level once it is removed from the load carrying platform. This can be extremely difficult with bulky and/or heavy items. Even with trailers that are able to tilt so that the rear is at or near ground level for loading and unloading, the load carrying platform may make a substantial angle that a person or persons loading the trailer must overcome in order to get the load onto the trailer. The significant angle also can make it difficult for the elderly, infirm or incapacitated to manipulate their mobility device onto the trailer safely and easily. Quite often the raised front end of the trailer will suddenly fall once the load moves far enough onto the load carrying platform of the trailer so as to reach the trailer's tipping point.

An aim of the present invention is to provide a multi-configurable trailer with a load carrying platform that can be raised or lowered so that the load carrying platform can be configured to lay flat on the ground that overcomes at least some of these problems.

DISCLOSURE OF THE INVENTION

Accordingly, in one aspect the invention, the invention is a height adjustable multi-configurable trailer including:
a chassis,
at least two wheels,
connector means,
height adjustment means, and
locking means,
wherein the chassis is substantially U shaped, with the closed end of the U at the front of the trailer, and the open end of the U at the rear. At least two wheels are each attached to one of the sides of the chassis respectively. The connector means is able to be raised or lowered via the control of the height adjustment means by an operator. When the connector means are lowered down so that they are substantially flush with the ground level, a wide variety of different attachments can be attached to, or removed from, the connector means, and once attached to the connector means, the attachment is releasably lockable in place via the locking means. At any time when the connector means are lowered down so that they are substantially flush with the ground, the base of the attachment sits substantially flush with the ground surface upon which the trailer stands, thereby permitting the easy loading and unloading of the load bearing platform of the attachment.

Preferably the connector means include a pair of forks which are attached to a crossbar that runs in a transverse direction to the longitudinal direction of the trailer, and the crossbar is configured to be raisable or lowerable by the height adjustment means.

Preferably the attachment is slidably engageable with the pair of forks, and when slid into place, the attachment is then releasably lockable to the trailer.

Preferably there are load equalisation means included which releasably connect to relevant portions of the attachment so that the weight of the attachment, and any load carried by it, is distributed throughout the chassis as the connector means are raised, thereby preventing the forks from bearing the full load.

Preferably the height adjustment means includes a mast located towards the front of the trailer.

Preferably the mast includes at least one pulley near its top, and a suitable cable is attachable to the crossbar, and overlays the pulley, and the free end of the cable is attachable to suitable winching means that are carried either on the towing vehicle, or on the trailer itself.

Preferably the winching means may be manual or electrically operated.

Preferably the mast includes at least one pulley near its top, and a suitable cable is attachable to the crossbar, and overlays the pulley, and the opposite end is attachable to a bi-directional hydraulic cylinder.

Optionally the mast includes a bi-directional hydraulic cylinder, and the cylinder is directly attachable to the crossbar.

Preferably the trailer includes a pump and a hydraulic fluid reservoir for supplying hydraulic fluid to the bi-directional cylinder under the influence of the pump, and the power supply to drive the pump is either carried on the trailer or is supplied by the towing vehicle.

Preferably the load equalisation means include a pair of side cables wherein a first runs down one side of the chassis, and the other runs down the other, and each side of the chassis includes a series of cable guides and pulleys that each respective cable runs along from the front to the rear of the trailer.

Preferably the end of each side cable at the front of the trailer is pivotally fixed to its respective portion of the chassis.

Preferably each end of the crossbar includes a substantially vertical extension, and the length of the vertical extension substantially corresponds to the distance that the connector means travels between its lowermost position at, or near, the ground, and its normal in-use raised position, and the uppermost end of each vertical extension includes a pulley that each respective side cable overlays.

Preferably a side cable front guide or front pulley is positioned on the rearward side of the vertical extension.

Preferably each side of the chassis nearest to the rear of the trailer includes a respective rear guide or rear pulley, and a portion of each side cable near the rear end of the trailer overlays the respective rear guide or rear pulley, and each side cable terminates in a free end that includes releasably connectable means that enable the free end of each side cable to be connected to the attachment, or the attachment locking means, once the attachment has been slid onto the connector means and locked into position.

Preferably each side cable distributes the load born by the load carried by the attachment due to the fact that as the attachment is raised or lowered, or when it is in its normal use position with the connecting means raised, the vertical extension on each side of the cross bar forces a localised portion of a respective side cable upwardly in the region of the side cable's length between each side cable's front fixed end and its respective front guide or front pulley. This localised raising of each side cable effectively causes the length of the cable, relative to the length of the chassis, to shorten a corresponding amount to the distance that the attachment can travel from its lowermost position to its normal use position, thereby causing each respective side cable to act upon a respective portion of the attachment, or the attachment locking means, under the influence of each side cable's respective rear pulley, which thereby causes the load to be distributed through the chassis.

Optionally the length of the vertical extension can be manually adjusted to fine tune the load distribution performance of each respective side cable.

BRIEF DESCRIPTION OF THE DRAWINGS

In order that the invention may be more fully understood there will now be described, by way of example only, preferred embodiments and other elements of the invention with reference to the accompanying drawings where.

DESCRIPTION OF EXAMPLES OF THE INVENTION AND THE PREFERRED EMBODIMENT

Figure 1:
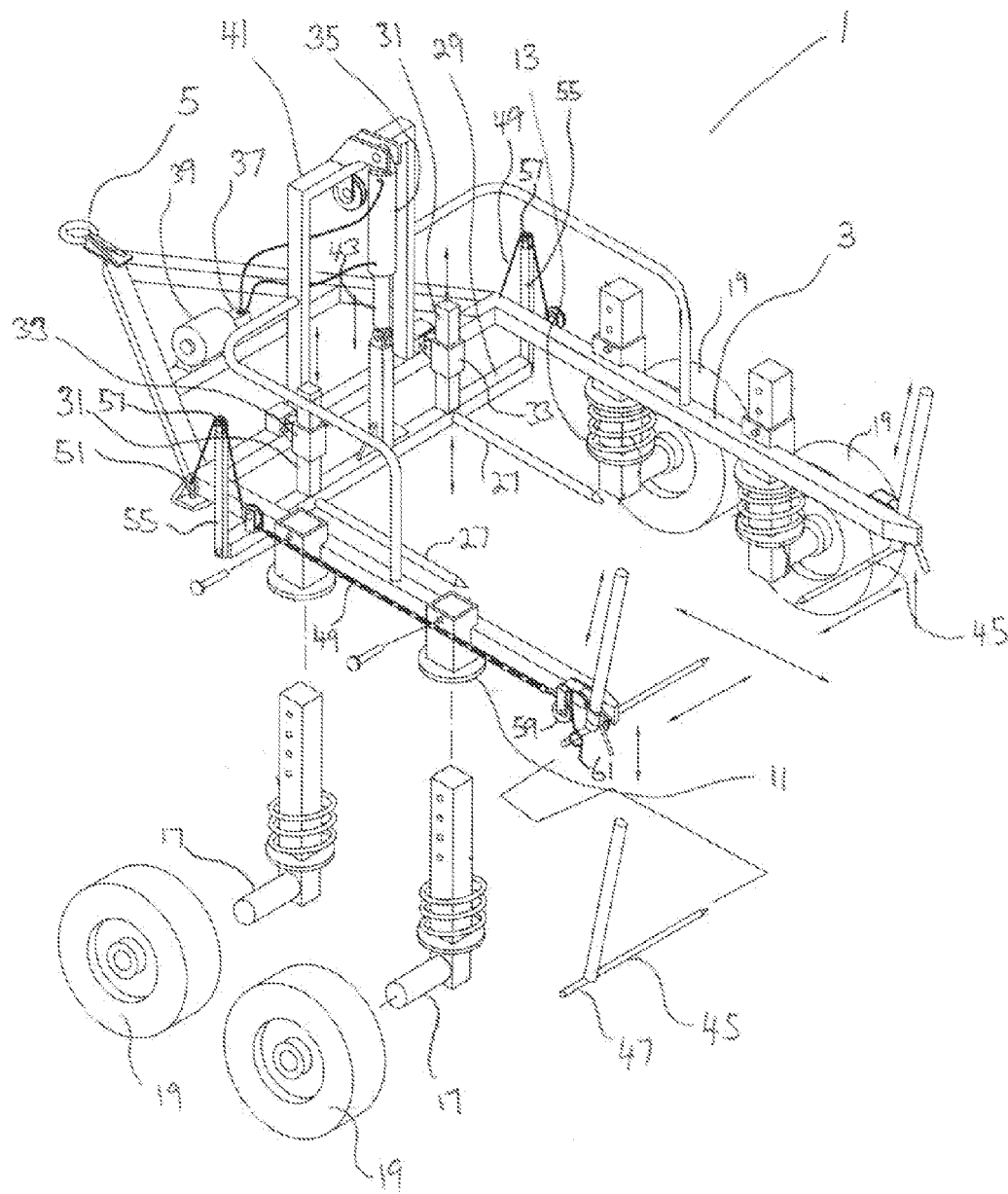
FIG. 1 is an exploded isometric view of the trailer of the present invention.

Referring to FIG. 1, where we see an exploded isometric view of the present invention, we see a trailer 1 having a chassis 3 that is in the shape of a U wherein the closed end of the U shape is towards the front of the trailer where the tow hitch 5 is located, and the open end of the U shape is at the rear of the trailer 1.

The trailer 1 includes height adjustable connector means 25 which include a pair of forks 27 and a cross bar 29. The cross bar 29 includes a pair of second vertical shafts 31, and these are sized to slide upwardly or downwardly inside complimentary collars 33 as indicated by the arrows. The cross bar 29 is connected to the controllable height adjustment means. In this figure, the controllable height adjustment means is illustrated as comprising a bi-directional hydraulic cylinder 35 that is directly coupled to the cross bar 29. The cylinder 35 is controlled by pump 37 which in turn is driven by the motor 39. The power supply for the motor 39 can either be carried on the trailer 1 itself, in the form of a battery, such as a car battery, or the power can be supplied by the towing vehicle for the trailer 1. The height adjustment means is housed a mast 41 that is shown in FIG. 1 as an inverted U shaped structure that is attached to the chassis 3 and rises substantially vertically, and is located towards the front of the trailer 1. When the bi-directional cylinder 35 is operated, the length of the cylinder shaft 43 is either extended or shortened, thereby raising or lowering the connector means.

When the connector means are lowered to the ground, the attachment is able to be slid onto the forks 27 from the rear of the trailer. When the attachment is fully engaged with the forks, locking means 45 are inserted into complimentary receiving locations within the attachment. Each locking means includes a short extension 47 that extends a short way laterally to the longitudinal direction of the trailer 1.

The trailer 1 also includes load equalization means include a pair of side cables 49. The forward most end of each cable 49 is pivotally attached to the chassis at 51. As shown, each end of the cross bar includes a vertical extension 55. The top of each vertical extension 55 there is an extension pulley 57. A first side pulley 53 is located on the chassis 3 on the rearward side to the location of the vertical extension 55 as shown. Each side cable 49 overlays its respective extension pulley 57 and then loops under its respective first side pulley 53. The cable then runs along the side of the chassis towards the rear of the trailer 1 where it eventually overlays the second side pulley 59, and then extends a short distance, and terminates at a free end that includes cable connector means 61. The connector means 61 on each side cable 49 is releasably attachable to its respective extension 47 once the attachment has been locked onto the forks 27. In this condition, when the cross bar 29 is raised under the influence of the bi-directional hydraulic cylinder 35, each vertical extension 55 starts moving upwardly as well. The extension pulley 57 pushes upwardly against its respective side cable 49, and this causes it to effectively shorten in length with respect to the length of the chassis 3 as more of the length of the side cable 49 is forced upwardly so as to form an inverted V shape. This in turn causes the cable connector means 61 to pull upwardly on the extension 47 of the locking means 45, and therefore causing a portion of the weight of the load borne by the attachment (not shown) to be carried by the side cables 48 in addition to the forks 27. This arrangement prevents the total weight of the attachment and any associated load to be carried entirely by the forks 27.

Also as shown in the Figure, wheel assemblies are independently attached to each side of the trailer. Each wheel 19 is connected to its own axle 17, and the axle does not extend across the trailer like on most conventional trailers, thereby leaving the space between the sides of the chassis 3 open to receive a variety of different types of attachment.

Figure 2A:
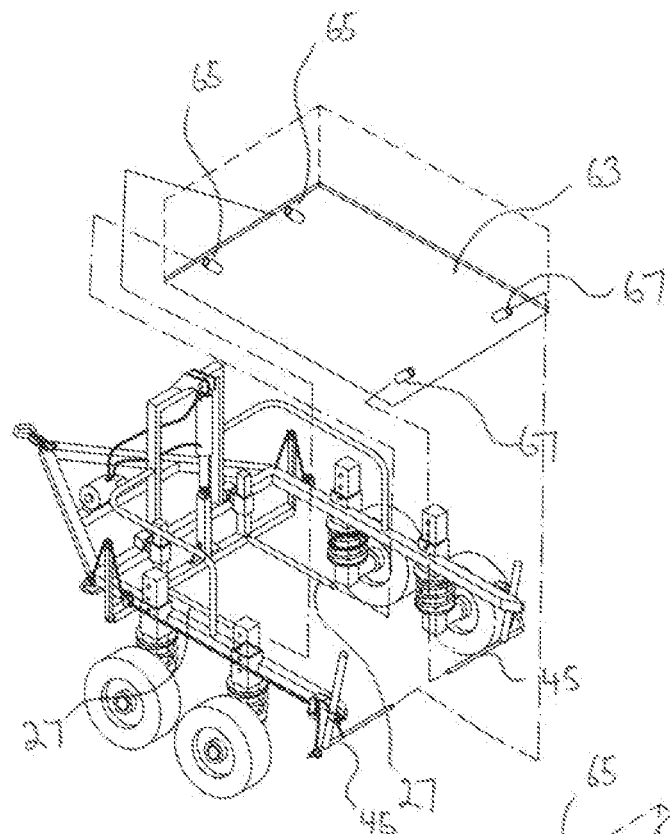
FIG. 2A and FIG. 2B show isometric views of the present invention with a simple tray attachment and also show two examples of height adjustment means
Figure 2B:
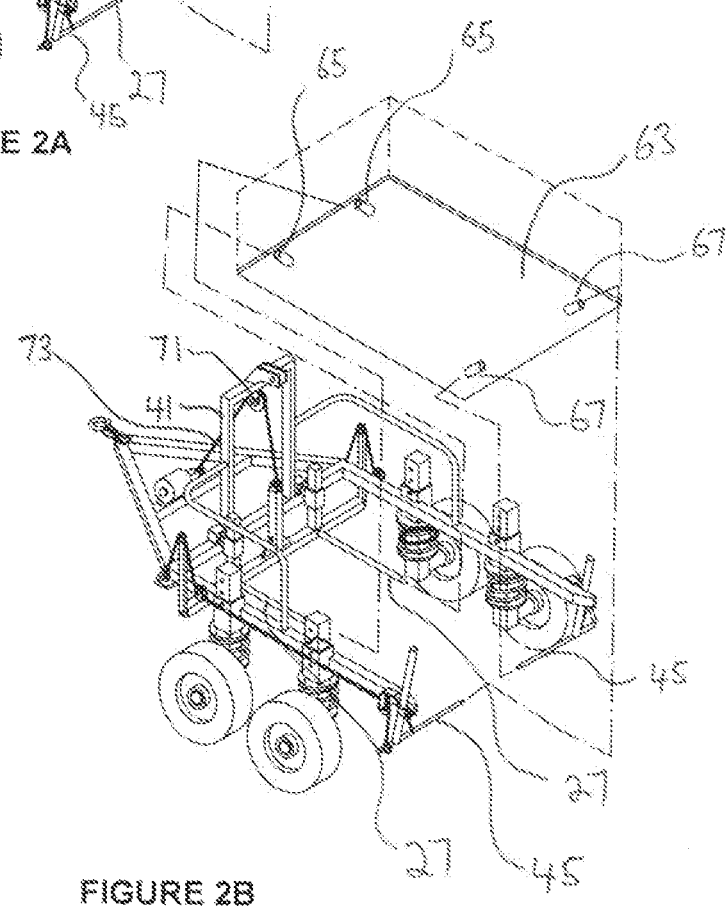

Turning to FIGS. 2A and 2B, we are shown and illustration of how the attachment 63 connects to the trailer. The attachment 63 includes a pair of front tubes 65 which each engages with a respective fork 27, and a pair of rear tubes 67 which each engages with a respective locking means 45 when the attachment 63 is properly seated on the forks 27. Also shown in FIG. 2B is an alternative arrangement for the height adjustment means. In this illustration, a suitable winch 69 is carried on the trailer 1. The winch 69 can be either a manual or electric powered winch. A mast pulley 71 is located at the top of the mast 41. A height adjustment cable 73 is connected to the winch 69 and looped over the mast pulley 71 and connected to the cross bar 29. In an alternative form of the invention, the winch may be carried by the towing vehicle instead of on the trailer.

Figure 3:
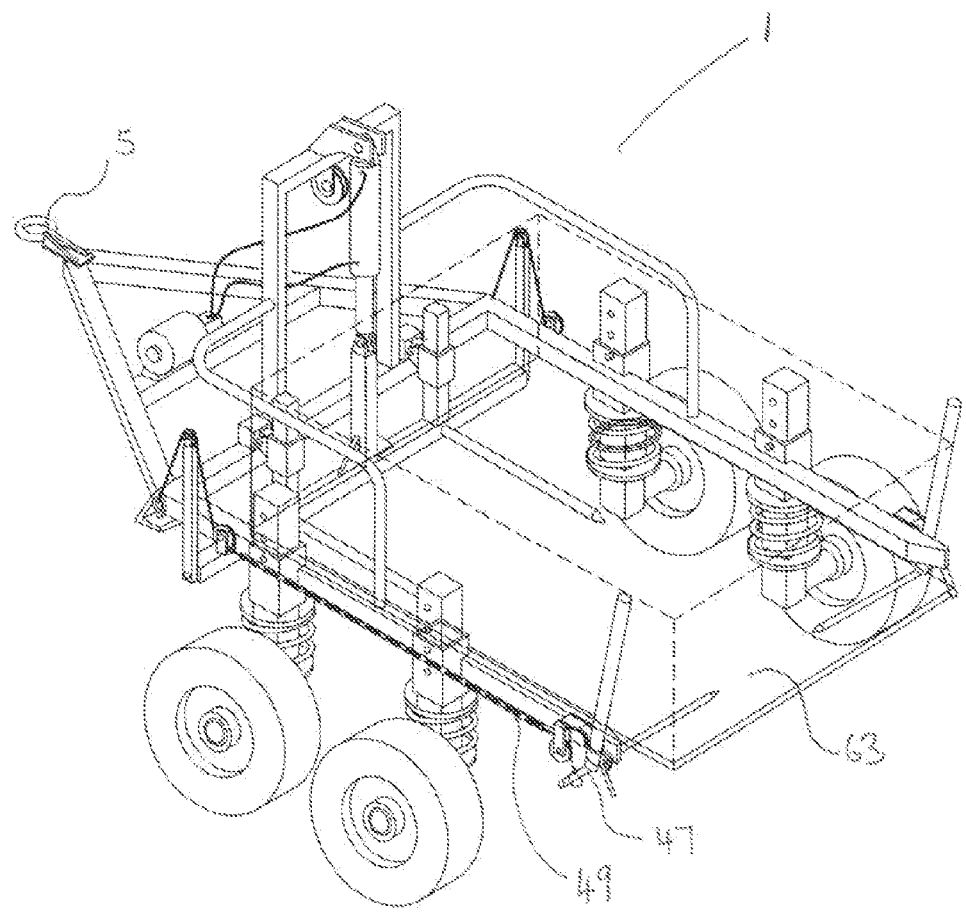
FIG. 3 is an isometric view of the trailer showing an example of the invention where the height adjustment means is a pump and a hydraulic cylinder.

Turning the FIG. 3, we are shown and isometric view with the attachment 63 locked onto the trailer 1, and the pair of side cables 49 have been attached to the each cable's respective extension 47. The height adjustment means have been used to lift the attachment 63 up to its normal operational height, and the trailer 1 is therefore in a condition to be towed by a suitable vehicle by connecting it to a conventional tow hitch 5. In this particular illustration, the attachment 63 is a simple flat tray. There are a wide variety of forms of the attachment 63 that can be used with the trailer. For example a cage attachment could be used for transporting animals. In another example, a simply plough attachment could be attached thereby allowing a suitable vehicle to combine with the trailer so configured in order to perform ploughing operations. This is particularly relevant to small farm operations such as hobby farm operations.

Also when the height adjustment means are used to lower the attachment down to ground level, it becomes easier to slide or roll loads onto and off the attachment. For example barrels can easily be rolled onto the attachment. Animals can easily enter or exit a cage like attachment. In domestic use, the elderly, infirm or incapacitated are able to simply drive their mobility enhancement device, such as an electric wheel chair onto, or off the attachment. The various attachments and loads can then be raised and transported from location to location.

Figure 4:
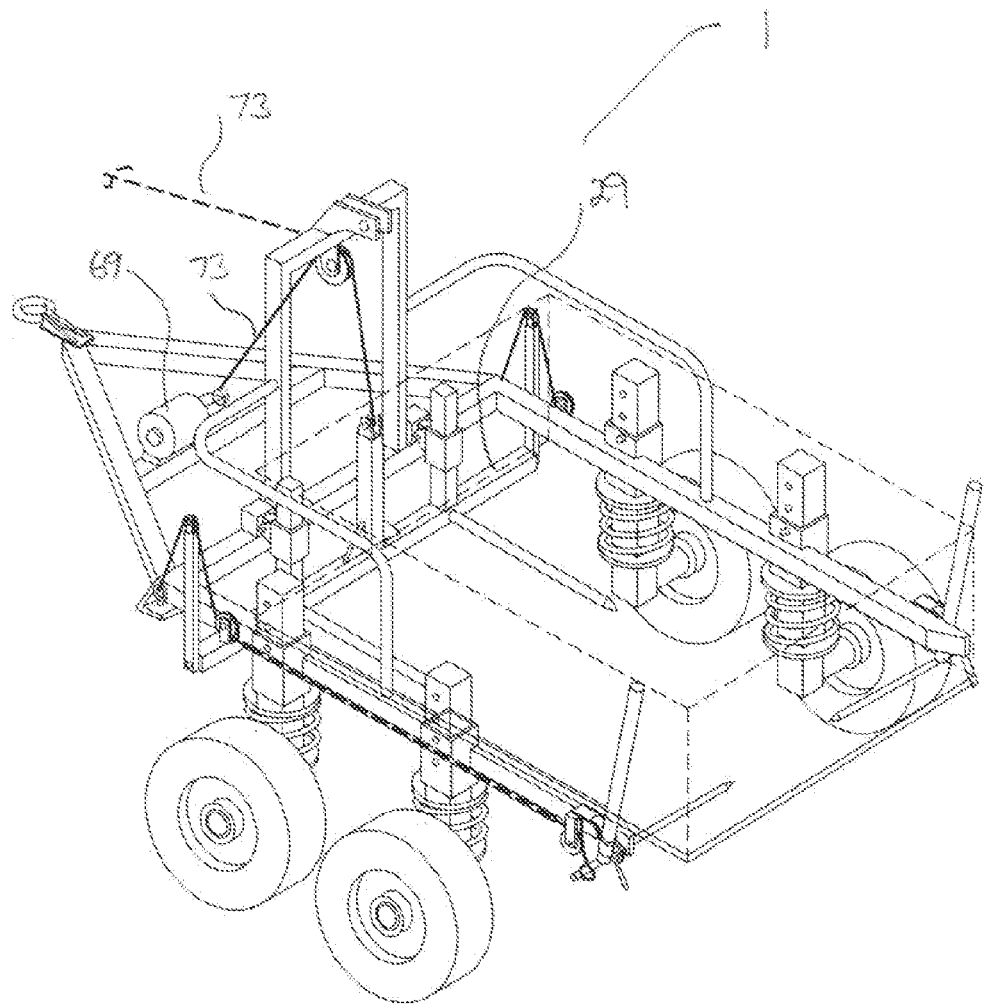
FIG. 4 is an isometric view of the trailer showing the use of a manual or electric winch carried directly by the trailer, and also an alternative configuration where the height adjustment cable can be connected to a manual or electric winch that is carried by the towing vehicle.

Turning to FIG. 4, we are see both options for using a winch 69 to adjust the height of the cross bar 29. In one form, the winch 69 is carried directly on the trailer 1 as shown. Alternatively, the winch may be carried on the towing vehicle. In this case, the height adjustment cable 73 (shown in dashed line) has releasable connecting means to the vehicle winch. In either arrangement, the winch may be of the manual or electrical type. In in the case where an electrical winch 69 is carried directly upon the trailer, the power supply to drive it may also be carried directly on the trailer, for example in the form or a car battery, or the power may be supplied by the towing vehicle.

Figure 5:
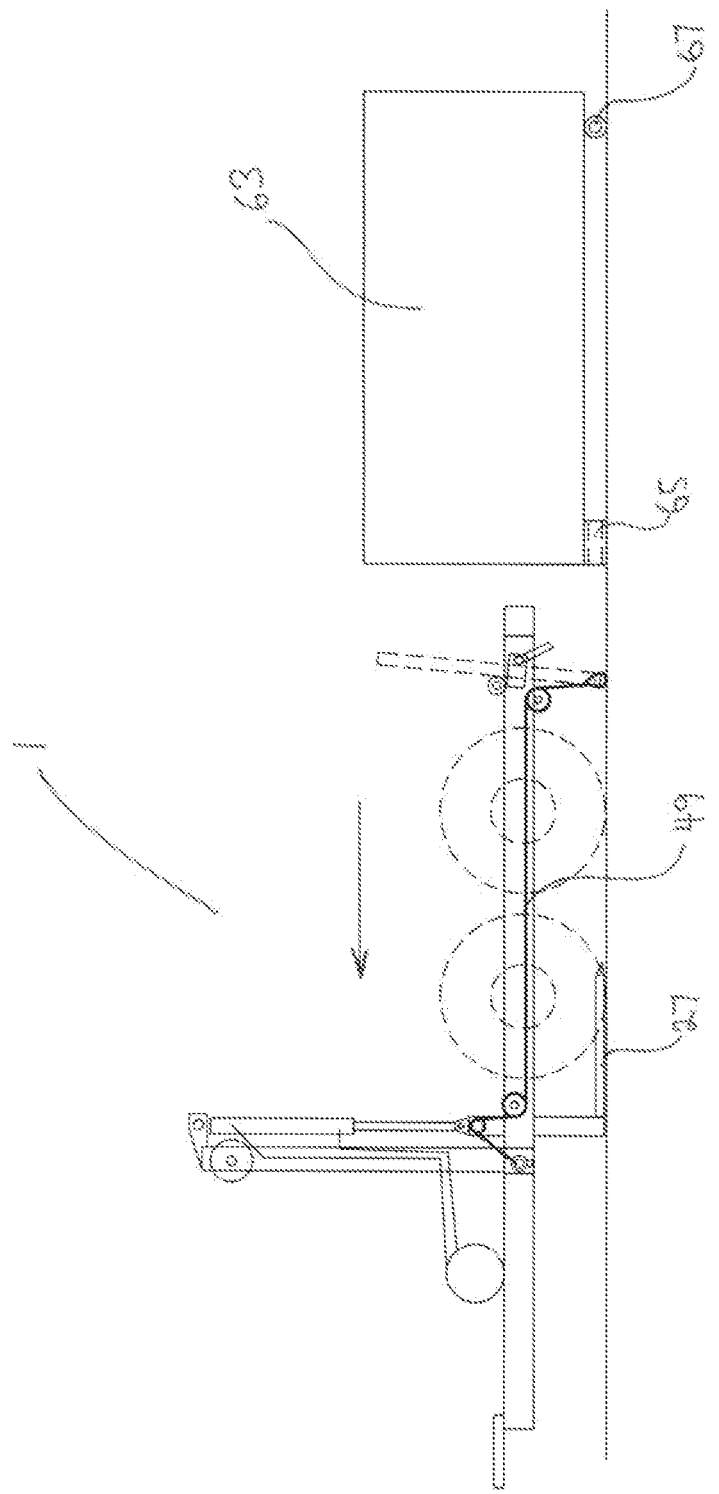
FIGS. 5, 6 and 7 show the various stages of the trailer as an attachment is connected to it, raised and then ready for towing.

Turning to FIG. 5, we see a side view of the trailer 1 configured to receive an attachment 63. The height adjustment means have been used to lower the cross bar to the ground, so therefore the forks 27 are in position to interengage with the front tubes 65 of the attachment 63 when the attachment is slid between the side of the chassis from the rear as shown by the arrow. Once the attachment 63 is properly positioned on the forks 27, the locking means 45 are connected to each respective rear tube 67. The ends of each side cable 49 are connected to the locking means 45. The attachment can now be raised via the height adjustment means and the trailer is ready to be transported.

Figure 6:
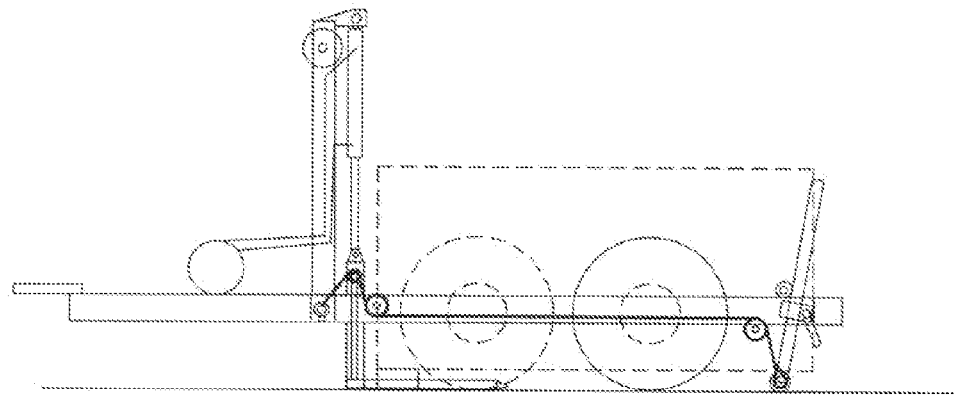
Figure 7:
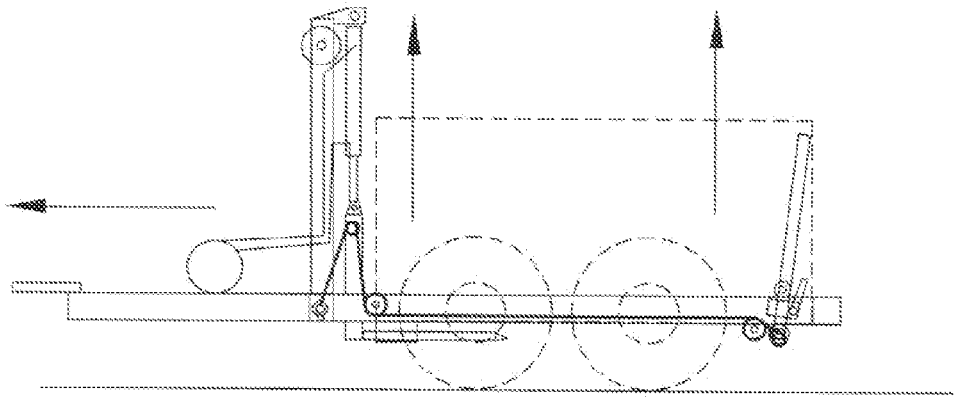

As illustrated in FIGS. 6 and 7, at any time when the trailer needs to be loaded or unloaded, the tray can be lowered back down to the ground so that its base sits substantially coplanar with the ground.

In a form of the invention, a removably connectable rear bumper bar is attachable to the rear ends of the chassis, and runs in a transverse direction. This rear bumper can be attached either when the trailer has no attachment connected, or when an attachment is connected. The rear bumper carries on it various running lights that may be required for a trailer to be towable on public roads, including turn indicators, brake lights and registration plate illumination lights. An electrical connector cable can run along one side of the chassis of the trailer from the vicinity of the tow hitch 5 to the rear of the chassis where it is able to make a releasable electrical connection to the bumper bar. The front end of the electrical cable is releasably connectable to the towing vehicle so that brake and turn signals in the vehicle are also displayed by the relevant lights on the bumper bar.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A height adjustable multi-configurable trailer including:
a chassis,
at least two wheels,
connector means,
height adjustment means, and
locking means,
wherein the chassis is substantially U shaped with the closed end of the U at the front of the trailer and the open end of the U at the rear, and the at least two wheels are each attached to one of the sides of the chassis respectively, and the connector means is able to be raised or lowered via the control of the height adjustment means by an operator, and when the connector means are lowered down so that they are substantially flush with the ground level, a wide variety of different attachments can be attached to, or removed from,
the connector means, and once attached to the connector means, an attachment is releasably lockable in place via the locking means, and at any time when the connector means are lowered down so that they are substantially flush with the ground, the base of the attachment sits substantially flush with the ground surface upon which the trailer stands, thereby permitting the easy loading and unloading of a load bearing platform of the attachment, wherein the connector means include a pair of forks which are attached to a crossbar that runs in a transverse direction to the longitudinal direction of the trailer, and the crossbar is configured to be raisable or lowerable by the height adjustment means.

2. A trailer as defined in claim 1 wherein the attachment is slidably engageable with the pair of forks, and when slid into place, the attachment is then releasably lockable to the trailer.

3. A trailer as defined in claim 2 wherein load equalisation means are included which releasably connect to relevant portions of the attachment so that the weight of the attachment, of any load carried by it, is distributed throughout the chassis as the connector means are raised, thereby preventing the forks from bearing the full load.

4. A trailer as defined in claim 3 wherein the height adjustment means includes a mast located towards the front of the trailer.

5. A trailer as defined in claim 4 wherein the mast includes at least one pulley near its top, and a suitable cable is attachable to the crossbar, and overlays the pulley, and the free end of the cable is attachable to suitable winching means that are carried either on a towing vehicle, or on the trailer itself.

6. A trailer as defined in claim 5 wherein the winching means may be manual or electrically operated.

7. A trailer as defined in claim 4 wherein the mast includes at least one pulley near its top, and a suitable cable is attachable to the crossbar, and overlays the pulley, and the opposite end is attachable to a bi-directional hydraulic cylinder.

8. A trailer as defined in claim 4 wherein the mast includes a bi-directional hydraulic cylinder, and the cylinder is directly attachable to the crossbar.

9. A trailer as defined in claim 7 wherein the trailer includes a pump and a hydraulic fluid reservoir for supplying hydraulic fluid to the bi-directional cylinder under the influence of the pump, and a power supply to drive the pump is either carried on the trailer or is supplied by the towing vehicle.

10. A trailer as claimed in claim 4 wherein the load equalisation means includes a pair of side cables wherein a first runs down one side of the chassis and the other runs down the other side of the chassis, and each side of the chassis includes a series of cable guides and pulleys that each respective cable runs along from the front to the rear of the trailer.

11. A trailer as claimed in claim 10 wherein the end of each side cable at the front of the trailer is pivotally fixed to its respective portion of the chassis.

12. A trailer as claimed in claim 11 wherein each end of the crossbar includes a substantially vertical extension, and the length of the vertical extension substantially corresponds to the distance that the connector means travels between its lowermost position at, or near the ground, and its normal in-use raised position, and the uppermost end of each vertical extension includes a pulley that each respective side cable overlays.

13. A trailer as claimed in claim 12 wherein a side cable front guide or front pulley is positioned on the rearward side of the vertical extension.

14. A trailer as claimed in claim 13 wherein each side of the chassis nearest to the rear of the trailer includes a respective rear guide or rear pulley, and a portion of each side cable near the rear end of the trailer overlays its respective rear guide or rear pulley, and each side cable terminates in a free end that includes releasably connectable means that enable the free end of each side cable to be connected to the attachment, or the locking means, once the attachment has been slid onto the connector means and locked into position.

15. A trailer as claimed in claim 14 wherein each side cable distributes a load resulting from the attachment being raised or lowered, the vertical extension on each side of the cross bar forces a localised portion of a respective side cable upwardly, and this localised raising of each side cable effectively causes the length of the cable, relative to the length of the chassis, to shorten, thereby causing each respective side cable to act upon a respective portion of the attachment, which thereby causes the load to be distributed through the chassis.

16. A trailer as claimed in claim 12 wherein the length of the vertical extension can be manually adjusted to fine tune the load distribution performance of each respective side cable.

17. A trailer as defined in claim 8 wherein the trailer includes a pump and a hydraulic fluid reservoir for supplying hydraulic fluid to the bi-directional cylinder under the influence of the pump, and a power supply to drive the pump is either carried on the trailer or is supplied by the towing vehicle.

18. A trailer as claimed in claim 5 wherein the load equalisation means includes a pair of side cables wherein a first runs down one side of the chassis and the other runs down the other side of the chassis, and each side of the chassis includes a series of cable guides and pulleys that each respective cable runs along from the front to the rear of the trailer.

19. A trailer as claimed in claim 6 wherein the load equalisation means includes a pair of side cables wherein a first runs down one side of the chassis and the other runs down the other side of the chassis, and each side of the chassis includes a series of cable guides and pulleys that each respective cable runs along from the front to the rear of the trailer.

* * * * *